(12) United States Patent
Zaiger

(10) Patent No.: US 6,517,287 B2
(45) Date of Patent: Feb. 11, 2003

(54) METHOD FOR REMOVING CONTAMINANTS FROM DREDGE MATERIAL IN AN UNDERWATER ENVIRONMENT

(75) Inventor: Kimo Kalani Zaiger, Somis, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/799,443

(22) Filed: Mar. 6, 2001

(65) Prior Publication Data

US 2002/0039520 A1 Apr. 4, 2002

Related U.S. Application Data

(63) Continuation-in-part of application No. 09/677,753, filed on Oct. 3, 2000, now Pat. No. 6,325,924.

(51) Int. Cl.[7] ................................................ C02F 11/00
(52) U.S. Cl. ........................ 405/128.25; 405/128.1; 37/321; 210/747; 299/9
(58) Field of Search .................. 405/128.45, 128.2, 405/128.25, 128.1; 299/8, 9; 37/307, 317, 323, 321; 210/747, 170

(56) References Cited

U.S. PATENT DOCUMENTS

| | | | | |
|---|---|---|---|---|
| 2,145,753 A | * | 1/1939 | Coulter | 166/107 |
| 3,301,606 A | * | 1/1967 | Bruno | 15/409 |
| 4,127,950 A | * | 12/1978 | Tillinghast et al. | 37/309 |
| 4,432,671 A | * | 2/1984 | Westra et al. | 114/296 |
| 4,447,541 A | | 5/1984 | Peterson | 435/264 |
| 4,687,373 A | | 8/1987 | Falk et al. | 588/252 |
| 4,844,839 A | * | 7/1989 | Manchak, Jr. | 166/285 |
| 4,891,320 A | | 1/1990 | Aust et al. | 435/262 |
| 5,085,998 A | | 2/1992 | Lebron et al. | 435/262.5 |
| 5,127,765 A | * | 7/1992 | Millgard | 405/128.45 |
| 5,162,600 A | | 11/1992 | Cody et al. | 588/236 |
| 5,256,001 A | * | 10/1993 | Millgard | 405/128.15 |
| 6,209,965 B1 | * | 4/2001 | Borns et al. | 299/17 |

FOREIGN PATENT DOCUMENTS

| | | | |
|---|---|---|---|
| FR | 2785900 A1 | * | 5/2000 |
| WO | WO 01/14649 A1 | * | 3/2001 |

* cited by examiner

Primary Examiner—David Bagnell
Assistant Examiner—John Kreck
(74) Attorney, Agent, or Firm—David Kalmbaugh

(57) ABSTRACT

A method of removing contaminated sediment material from a contaminated area on the ocean floor using a reactor vessel wherein seawater is from within the interior of the reactor vessel so that the vessel penetrates the ocean floor. A pressurized fluid is introduced into the reactor vessel to create a slurry vortex of the contaminated sediment material and then a remediation fluid injected into the slurry vortex of the contaminated sediment material using a sufficient amount of the remediation fluid to remediate the contaminated sediment material and provide a noncontaminated sediment material. Pressurized seawater is injected into the interior of the reactor vessel to create a positive pressure within the reactor vessel to lift the reactor vessel above the ocean floor allowing for a transfer of the reactor vessel to another area of sediment contamination on the ocean floor.

19 Claims, 3 Drawing Sheets

METHOD FOR REMOVING CONTAMINANTS FROM DREDGE MATERIAL IN AN UNDERWATER ENVIRONMENT

This application is a continuation-in-part of U.S. patent application Ser. No. 09/677,753, filed Oct. 3, 2000, now U.S. Pat. No. 6,325,924.

BACKGROUND OF THE INVENTION

1. Field of the Invention

The present invention relates generally to a method for removing contaminants from dredge material. More specifically, the present invention relates to a method which uses a reactor vessel to generate a slurry vortex to treat contaminated sediments in an underwater environment.

2. Description of the Prior Art

At present, technologies and processes for managing contaminated dredge material in an under water environment require elaborate contaminant separation, handling, treatment and disposal facilities and processes. Innovative dredge heads have been designed during the last decade in an attempt to mitigate the environmental impact of dredging in conjunction with site specific processes and operations for the removal of contaminants from the ocean floor and monitoring procedures for determining the level of contamination.

Nevertheless, physical removal of contaminated sediments by conventional dredging processes invariably results in contaminant losses and off site migration due to the generation of sediment plumes and desorption of contaminants when exposed to oxidizing lacustrine or sea water. Following removal, highly contaminated dredged material can be classified as hazardous waste, requiring physical separation from "clean spoils", or non-contaminated sand and soils, special handling, ex situ treatment and/or expensive disposal in land based hazardous waste sites. The disposal of highly contaminated dredged material can be very costly, i.e., up to one thousand dollars per cubic yard. There is also the additional problem of filling land fills with contaminated sediments since these land fills generally have limited available space for hazardous waste disposal.

In many cases, severe contaminated sediments are derived from a single pollutant source, such as a shore-based industrial facility which has dumped contaminants into a nearby stream or river or directly into the lake or ocean. In these cases the contamination is often concentrated in "hot spots" in close proximity to their source.

Accordingly, there is a need to provide for a method or process which allows for in situ cleanup of highly contaminated sediment reducing "hot spot" sediment contaminant levels.

Reducing "hot spot" sediment contaminant levels allows for the leaving of cleaned sediments in their place, or for the removal and disposal by conventional dredging methods with minimal environmental risk.

SUMMARY OF THE INVENTION

The present invention overcomes some of the difficulties of the past including those mentioned above in that it comprises a relatively simple yet highly effective method which uses a reactor vessel for in situ cleanup of severe sediment contamination in an underwater environment.

The method of the present invention comprises the steps of (1) positioning a reactor vessel above a contaminated area on the ocean floor which has a contaminated sediment material;

(2) penetrating the contaminated area on the ocean floor with the reactor vessel by removing seawater from within the reactor vessel to create a negative pressure within the reactor vessel;

(3) introducing a pressurized fluid into the reactor vessel to create a slurry vortex of the contaminated sediment material;

(4) injecting a remediation fluid into the slurry vortex of the contaminated sediment material using a sufficient amount of the remediation fluid to remediate the contaminated sediment material and provide a noncontaminated sediment material; and (5) injecting pressurized seawater into the interior of the reactor vessel to create a positive pressure within the reactor vessel to lift the reactor vessel above the ocean floor allowing for a transfer of the reactor vessel to another area of sediment contamination on the ocean floor.

DETAILED DESCRIPTION OF THE PREFERRED ENVIRONMENT

Figure 1:
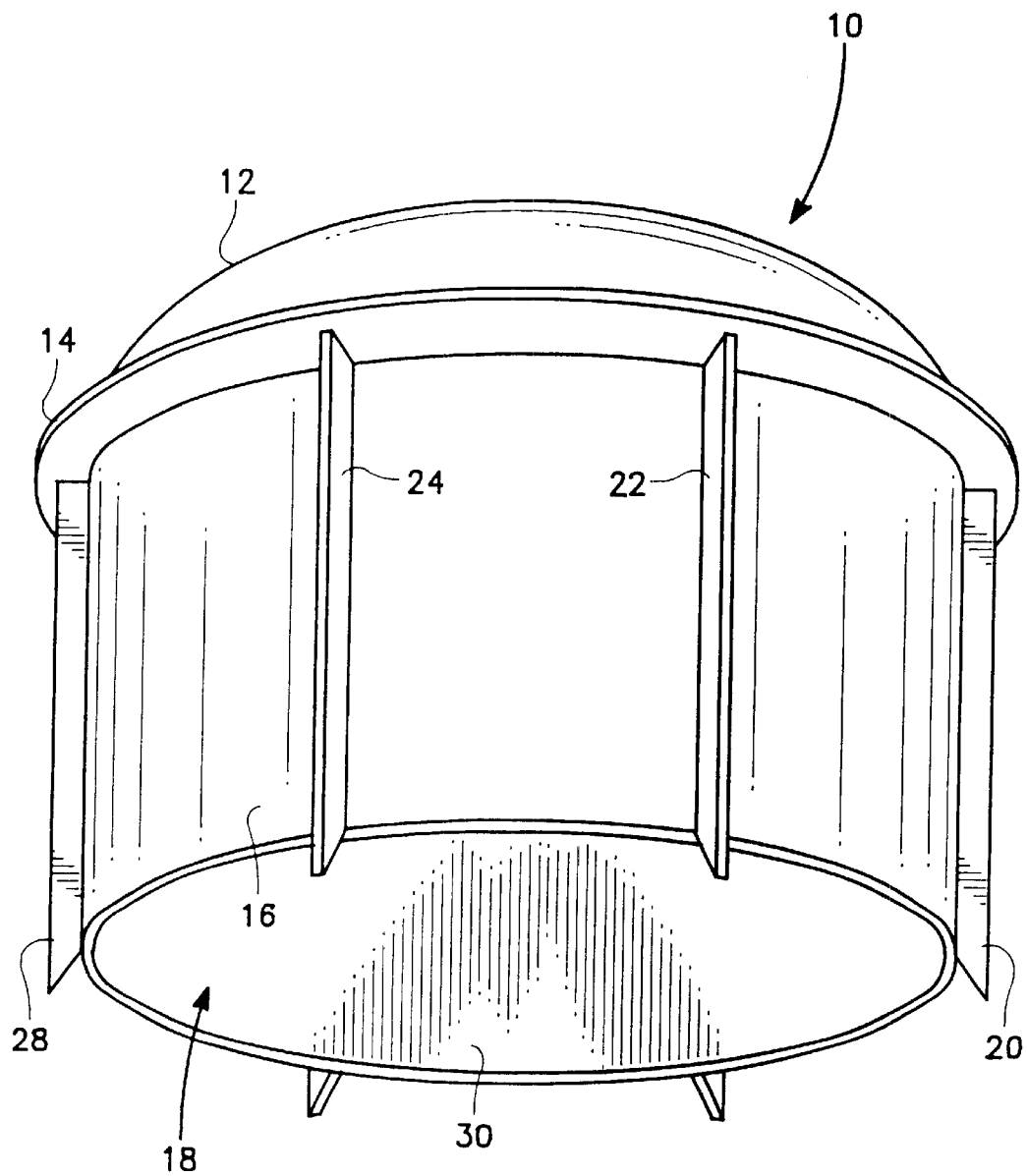
FIG. 1 is a perspective view of the reactor vessel for removing contaminants from dredge material in an under water environment which constitutes the present invention.
Figure 2:
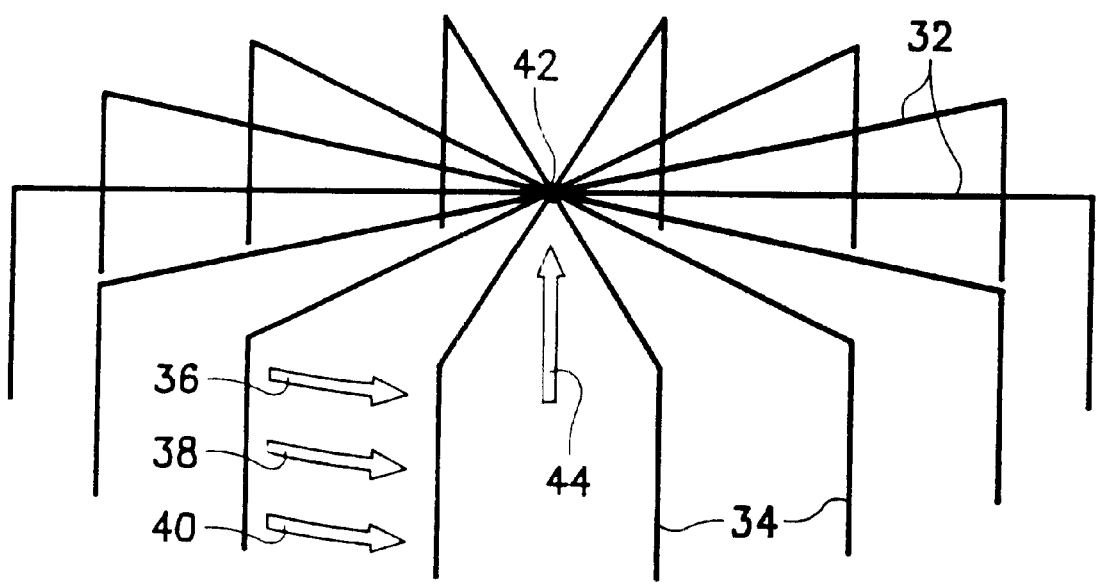
FIG. 2 is a perspective view of the fluid flow system for the reactor vessel of FIG. 1.
Figure 3:
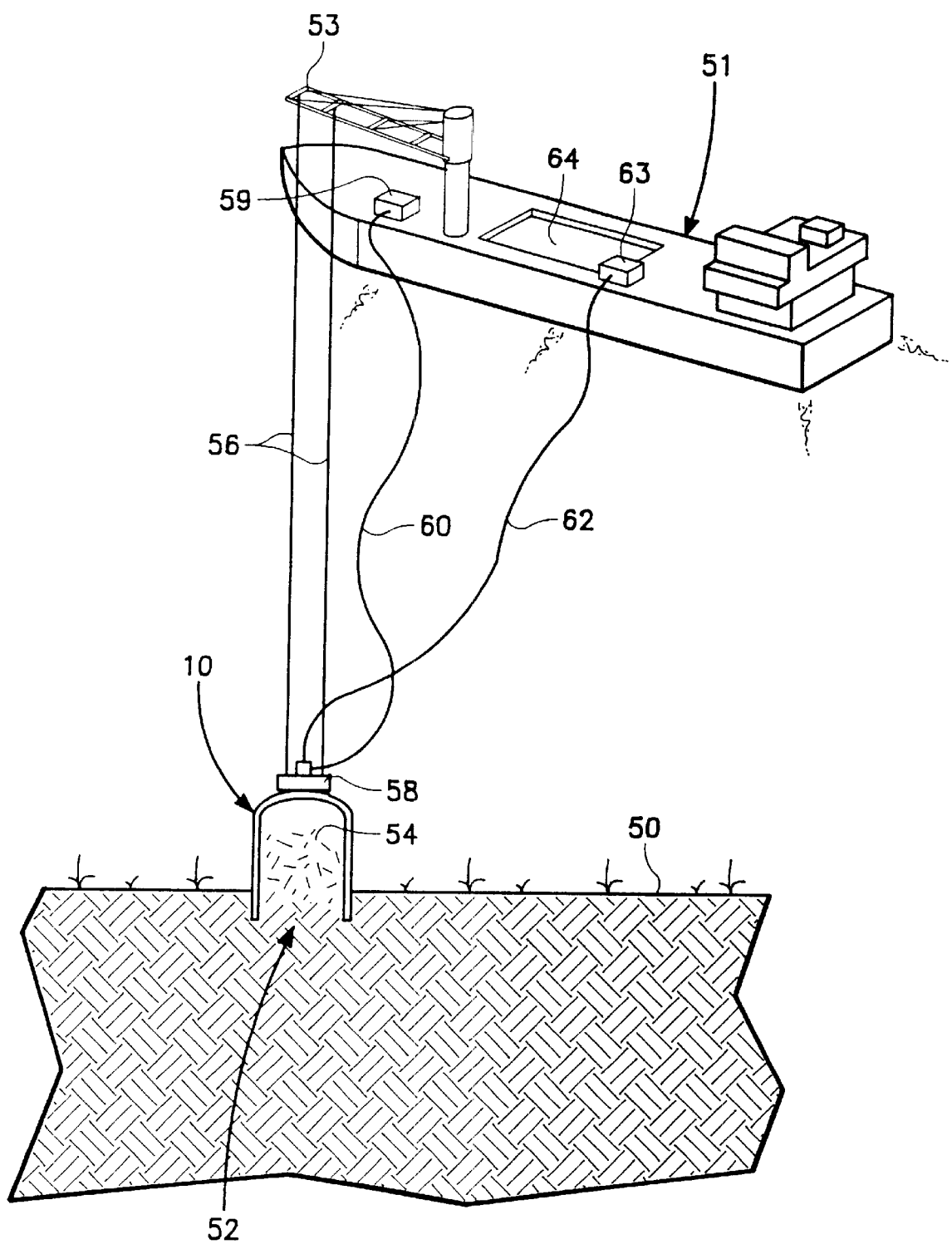
FIG. 3 is a view illustrating the reactor vessel of FIG. 1 being used in an operational environment to remediate or extract contaminants from soils and sand in a seabed.

Referring to FIGS. 1, 2 and 3, there is shown a reactor vessel, designated generally by the reference numeral 10, which can be used to efficiently perform in situ treatment of contaminated sediments at "hot spot" areas in harbors or estuaries or in other underwater environments as is best depicted in FIG. 3. The reusable reactor vessel 10 may be coupled to a portable surface remediation treatment unit that may be mounted on a barge or ship 51 (FIG. 3) or stationed on a nearby pier. A detailed description of the operation of the reactor vessels follows.

Referring to FIG. 3, the reactor vessel 10 is deployed by gently lowering the reactor vessel 10 to the sediment surface 50 which may, for example, be the ocean floor or the silty soil of a harbor or estuary. A boom 53 is mounted on the deck of ship 51 near the bow of ship 51. The boom 53, which includes a guide wire 56, is used to deploy reactor vessel 10 to a site on sediment surface 50 which is a known location of contaminated sediments and is designated generally by the reference numeral 52. Mounted on the top portion of reactor vessel 10 and affixed thereto is a pulley assembly 58 which engages guide wire 56 which, in turn, allows for the deployment and retrieval of reactor vessel 10 to and from areas of contaminated sediments 52.

Once reactor vessel 10 is positioned on the sediment surface 50, reactor vessel 10 is emplaced into the contaminated sediments 52 using suction pile technology. The contaminated sediments 52 is penetrated in a highly controlled manner, by evacuating fluid, which may be seawater or fresh water, from the interior 18 of reactor vessel 10. Withdrawing the fluid from the interior 18 of reactor vessel 10 (as indicated generally by arrow 44) creates a negative pressure within the interior 18 of reactor vessel 10 which results in the static pressure of the water column above reactor vessel 10 providing an emplacement force on reactor vessel 10 as the induced differential pressure is returned to equilibrium. The generation of this force results in the cylindrical shaped skirt 30 (FIG. 1) of reactor vessel 10 penetrating the ocean floor below sediment surface 50 to a deeper depth than the contaminated sediment layers effectively isolating the contaminated material from the surrounding soil material as shown in FIG. 3.

Referring to FIG. 3, a flexible hose line 60 which connects the interior 18 of reactor vessel 10 to a pump 59 provides a fluid passageway between the interior 18 of reactor vessel 10 and pump 59 allowing pump 59, when activated, to withdraw fluid from the interior 18 of reactor vessel 10 transferring the fluid to a holding/processing tank 64 on board ship 51. Pump 59 is mounted on the deck of ship 51 toward the bow of ship 51.

Referring to FIGS. 1 and 3, the reactor vessel 10 includes cylindrical shaped skirt 30; a dome 12 mounted on the upper end of cylindrical shaped skirt 30 and affixed thereto; and a penetration limit ring 14 attached the outer surface 16 of cylindrical shaped skirt 30 at the upper end of cylindrical shaped skirt 30. Reactor vessel 10 also has a plurality of equally spaced apart anchoring vanes 20, 22, 24 and 26 which are attached to the outer surface 16 of cylindrical shaped skirt 30. Each anchoring vane 20, 22, 24 and. 26 extend outwardly from cylindrical shaped skirt 30 at an angle which is approximately ninety degrees with respect to the outer surface 16 of cylindrical shaped skirt 30. As seen in FIG. 1, the lower end of of each of the anchoring vanes 20, 22, 24 and 26 forms an angle of approximately sixty degrees with respect to a horizontal plane, thus forming a pointed edge which allows for easier penetration of reactor vessel 10 into the ocean floor in the manner shown in FIG. 3. As also seen in FIG. 1, the upper end of each of the anchoring vanes 20, 22, 24 and 26 abuts penetration limit ring 14 and is affixed thereto.

While the size and shape of the reactor vessel 10 can be adjusted to fit a specific need for in situ treatment of contaminated sediments, a typical size may be as follows: (1) a 30 ft. diameter cylindrical shaped skirt; (2) a height of 10 ft. with a sealed off top for a total reactor volume of approximately 7000 ft$^3$; and (3) a penetration depth of approximately 7 ft. before penetration limit ring 14 limits further penetration into the contaminated sediments 52 below the ocean floor 50. Reactor head space within the interior of dome 12 is maintained within reactor vessel 10 to allow sufficient volume to slurry the contaminated material, in effect creating a fluidized bed reactor that can be used with various physical systems, and chemical and biological agents to treat a wide variety of contaminants.

Referring to FIGS. 1, 2 and 3, FIG. 2 illustrates the fluid flow system for the interior of reactor vessel 10 which generates the slurry vortex of contaminated sediments 54. A circulation pump 63 mounted on the deck of ship 51 may be used as a source for providing pressurized fluid (fresh water or salt water) to the fluid flow system of FIG. 2. A flexible hose line 62 connects circulation pump 63 to the fluid flow system (FIG. 2) within the interior 18 of reactor vessel 10.

Flexible hose line 62 connects circulation pump 63 to a control manifold 42 for the fluid flow system of FIG. 2. The contaminated sediments contained within the reactor will be entrained into a slurry vortex 54 created by circulation pump 63 in combination with directional discharge flow jets (represented by arrows 36, 38 and 40) configured as a radial network inside the reactor vessel 10. The radial network includes a plurality of horizontally positioned fluid passageways 32 extending radially outward from control manifold 42. Extending vertically downward from each fluid passageway 32 is a vertically positioned fluid passageway 34 which includes the directional discharge flow jets 36, 38 and 40.

In an alternate environment, slurry vortex 54 may be generated by submersible circulation pumps (instead of circulation pump 63) in combination with discharge flow jets 36, 38 and 40 mounted in a radial network inside the reactor vessel 10.

As the slurry 54 within the reactor vessel 10 is isolated from the surrounding waters, the physicochemistry properties of slurry 54 is controlled by the addition of reagents or removal of ions/chemical reaction by-products as a treatment fluid is recirculated. Anchoring vanes 20, 22, 24 and 26 resist torque moments applied to reactor vessel 10 which are induced by the slurry vortex 54.

A remediation fluid is next injected into the slurry 54 via the directional discharge flow jets 36, 38 and 40 and controlled by circulation to and from a holding/process tank 64 of a portable surface treatment unit located on board ship 51.

Any suitable remediation fluid may be injected into the contaminated material in accordance with process of the present invention. The choice of remediation fluid and its constituents will depend upon site conditions and the contaminants sought to be remediation. For example, an aqueous solution of hydrogen peroxide may be used for in situ remediation of underground hydrocarbon contamination caused by gasoline and fuel oil, motor oil, polychlorinated biphenyl, benzene, chlorinated ethylene solvents, ethyl benzene and other like contaminants. Hydrogen peroxide oxidizes organic pollutants, breaking down complex organic compounds into successively smaller chain compounds which ultimately become non-hazardous carbon dioxide and water.

Another illustrative example of a suitable remediation fluid is a liquid lime solution which may be injected in the contaminated material in accordance with a process of this invention. A liquid biostimulant such as POLYBAC-N.TM., POLYBAC-E.TM. biostimulants and appropriate microorganism such as HYDROBAC.TM., PETROBAC.TM., and PHENOBAC.TM are sold by Polybac Corp. of Bethleham, Pa. and may be injected to treat contaminants such as mineral oil, glycol or chlorinated phenols. Other suitable bioremediaition fluids and nutrients include the white rot fungus disclosed in U.S. Pat. Nos. 4,891,320 and 5,085,998 and the corresponding biostimulants including lignin, cellulose and humus disclosed therein. Other suitable remediation fluid and reagents may be the alkali constituents and sulfoxide catalyst disclosed in U.S. Pat. No. 4,447,541; the aqueous silicate solutions and fixatives disclosed in U.S. Pat. No. 4,687,373 and the calcium orthophosphate agents and remediation constituents disclosed in U.S. Pat. No. 5,162, 600. Following treatment, the reactor vessel is removed from the sediment by reversing the emplacement pumping procedure, that is pump 59 injects pressurized fluid (e.g. pressurized seawater) into the interior 18 of reactor vessel 10 creating a positive pressure within interior 18 of reactor vessel 10 lifting reactor vessel 10 from contaminated sediments 52.

Reactor vessel 10 is relocated and reset on an adjacent area which may contain highly contaminated sediments.

It should be noted that reactor vessels can be designed in small sizes, to fit between pilings to remediate contaminated sediments under piers and in large sizes (30 feet or more in diameter) for general basin treatment.

From the foregoing, it may readily be seen that the present invention comprises a new, unique and exceedingly useful method for removing contaminants from dredge material in an underwater environment which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A method for treating contamination within the ocean floor comprising the steps of:
    (a) positioning a reactor vessel above a contaminated area on the ocean floor which has a contaminated sediment material;
    (b) penetrating the contaminated area on the ocean floor with said reactor vessel by withdrawing seawater from within said reactor vessel to create a negative pressure within said reactor vessel, said seawater being withdrawn from an interior of said reactor vessel using a pump connected to the interior of said reactor vessel;
    (c) transferring said seawater withdrawn from the interior of said reactor vessel to a holding tank located on board a ship;
    (d) introducing a pressurized fluid into said reactor vessel to create a slurry vortex of said contaminated sediment material;
    (e) injecting a remediation fluid into the slurry vortex of said contaminated sediment material using a sufficient amount of said remediation fluid to remediate the contaminated sediment material and provide a noncontaminated sediment material; and
    (f) injecting pressurized seawater into the interior of said reactor vessel to create a positive pressure within said reactor vessel to lift said reactor vessel above the ocean floor allowing for a transfer of said reactor vessel to another area of sediment contamination on the ocean floor.

2. The method as set forth in claim 1 wherein said pressurized seawater is injected into the interior of said reactor vessel by said pump to create said positive pressure within said reactor vessel.

3. The method as set forth in claim 1 wherein the slurry vortex of said contaminated sediment material is created by passing said pressurized fluid through a plurality of directional discharge flow jets configured as a radial network located inside of said reactor vessel.

4. The method as forth in claim 3 wherein a circulation pump is connected to said plurality of said direction discharge flow jets to supply said pressurized fluid to said plurality of said direction-discharge flow jets.

5. The method as set forth in claim 1 wherein said remediation fluid is injected into the slurry vortex of said contaminated sediment material by a plurality of directional discharge flow jets configured as a radial network located inside of said reactor vessel and a circulation pump connected to said plurality of directional discharge flow jets.

6. The method as set forth in claim 1 wherein said remediation fluid comprises an aqueous solution of hydrogen peroxide.

7. The method as set forth in claim 1 wherein torque moments applied to said reactor vessel when said reactor vessel creates the slurry vortex of said contaminated sediment materials are resisted by a plurality of equally spaced apart anchoring vanes attached to an outer surface of said reactor vessel, each of said plurality of anchoring vanes extending outwardly from said reactor vessel at an angle which is approximately ninety degrees with respect to the outer surface of said reactor vessel.

8. The method as set forth in claim 1 wherein penetration of said reactor vessel into the contaminated area on the ocean floor is limited by a penetration limit ring attached to the outer surface of said reactor vessel, said penetration ring being located at the upper end of said reactor vessel.

9. The method of claim 8 wherein a depth of penetration of said reactor vessel into the contaminated area of the ocean floor is limited to approximately seven feet by said penetration limit ring.

10. A method for treating contamination within the ocean floor comprising the steps of:
    (a) positioning a reactor vessel above a contaminated area on the ocean floor which has a contaminated sediment material;
    (b) penetrating the contaminated area on the ocean floor with said reactor vessel by withdrawing seawater from within said reactor vessel to create a negative pressure within said reactor vessels said reactor vessel being limited to a depth of penetration within the ocean floor by a penetration limit ring attached to the outer surface of said reactor vessel at the upper end of said reactor vessel;
    (c) introducing a pressurized fluid into said reactor vessel to create a slurry vortex of said contaminated sediment material;
    (d) injecting a remediation fluid into the slurry vortex of said contaminated sediment material using a sufficient amount of said remediation fluid to remediate the contaminated sediment material and provide a noncontaminated sediment material;
    (e) resisting torque moments applied to said reactor vessel when said reactor vessel creates the slurry vortex of said contaminated sediment materials by attaching a plurality of equally spaced apart anchoring vanes to an outer surface of said reactor vessel, each of said plurality of anchoring vanes extending outwardly from said reactor vessel at an angle which is approximately ninety degrees with respect to the outer surface of said reactor vessel; and
    (f) injecting pressurized seawater into the interior of said reactor vessel to create a positive pressure within said reactor vessel to lift said reactor vessel above the ocean floor allowing for a transfer of said reactor vessel to another area of sediment contamination on the ocean floor.

11. The method as set forth in claim 10 wherein said seawater is withdrawn from an interior of said reactor vessel using a pump connected to the interior of said reactor vessel and transferred to a holding tank located on board a ship.

12. The method as set forth in claim 11 wherein said pressurized seawater is injected into the interior of said reactor vessel by said pump to create said positive pressure within said reactor vessel.

13. The method as set forth in claim 10 wherein the slurry vortex of said contaminated sediment material is created by passing said pressurized fluid through a plurality of directional discharge flow jets configured as a radial network located inside of said reactor vessel.

14. The method as forth in claim 13 wherein a circulation pump is connected to said plurality of said direction discharge flow jets to supply said pressurized fluid to said plurality of said direction discharge flow jets.

15. The method as set forth in claim 10 wherein said remediation fluid is injected into the slurry vortex of said contaminated sediment material by a plurality of directional discharge flow jets configured as a radial network located inside of said reactor vessel and a circulation pump connected to said plurality of directional discharge flow jets.

16. The method as set forth in claim 10 wherein said remediation fluid comprises an aqueous solution of hydrogen peroxide.

17. A method for treating contamination within the ocean floor comprising the steps of:

(a) positioning a reactor vessel above a contaminated area on the ocean floor which has a contaminated sediment material, said reactor vessel including a cylindrical shaped skirt having an upper end and a dome mounted on an upper end of said cylindrical shaped skirt and affixed thereto;

(b) penetrating the contaminated area on the ocean floor with said reactor vessel by withdrawing seawater from within said reactor vessel to create a negative pressure within said reactor vessel, said reactor vessel being limited to a depth of penetration of approximately seven feet within the ocean floor by a penetration limit ring attached to the outer surface of said reactor vessel at the upper end of said reactor vessel;

(c) introducing a pressurized fluid into said reactor vessel to create a slurry vortex of said contaminated sediment material;

(d) injecting a remediation fluid into the slurry vortex of said contaminated sediment material using a sufficient amount of said remediation fluid to remediate the contaminated sediment material and provide a noncontaminated sediment material;

(e) resisting torque moments applied to said reactor vessel when said reactor vessel creates the slurry vortex of said contaminated sediment materials by attaching a plurality of equally spaced apart anchoring vanes to an outer surface of said reactor vessel, each of said plurality of anchoring vanes extending outwardly from said reactor vessel at an angle which is approximately ninety degrees with respect to the outer surface of said reactor vessel; and (f) injecting pressurized seawater into the interior of said reactor vessel to create a positive pressure within said reactor vessel to lift said reactor vessel above the ocean floor allowing for a transfer of said reactor vessel to another area of sediment contamination on the ocean floor.

18. The method as set forth in claim 17 wherein said seawater is withdrawn from an interior of said reactor vessel using a pump connected to the interior of said reactor vessel and transferred to a holding tank located on board a ship.

19. The method as set forth in claim 18 wherein said pressurized seawater is injected into the interior of said reactor vessel by said pump to create said positive pressure within said reactor vessel.

* * * * *